(12) United States Patent
Aminaka

(10) Patent No.: US 6,559,912 B2
(45) Date of Patent: May 6, 2003

(54) POLARIZER WITH PROTECTIVE FILM CONSISTING OF ONE CELLULOSE ACETATE FILM HAVING PARTICULAR PARAMETERS

(75) Inventor: Eiichiro Aminaka, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/233,525

(22) Filed: Sep. 4, 2002

(65) Prior Publication Data

US 2003/0067573 A1 Apr. 10, 2003

Related U.S. Application Data

(62) Division of application No. 09/797,947, filed on Mar. 5, 2001, now Pat. No. 6,476,892.

(30) Foreign Application Priority Data

Mar. 3, 2000 (JP) ........................................ 2000-058686

(51) Int. Cl.[7] ...................... G02F 1/1335; G02F 1/1333
(52) U.S. Cl. .......................................... 349/96; 349/122
(58) Field of Search ................................. 349/117, 119, 349/96, 138, 122

(56) References Cited

U.S. PATENT DOCUMENTS

| | | | |
|---|---|---|---|
| 5,739,881 A | 4/1998 | Xu et al. | 349/118 |
| 6,028,651 A | 2/2000 | Abileah et al. | 349/123 |
| 6,285,430 B1 | 9/2001 | Saito | 349/141 |

FOREIGN PATENT DOCUMENTS

| EP | 0 911656 A2 | 10/1998 |
|---|---|---|

*Primary Examiner*—Toan Ton
(74) *Attorney, Agent, or Firm*—Burns, Doane, Swecker & Mathis, LLP

(57) ABSTRACT

A liquid crystal display can be optically compensated by only one cellulose acetate film. The film comprises cellulose acetate and an aromatic compound having at least two aromatic rings. The cellulose acetate has an acetic acid content in the range of 59.0 to 61.5%. The aromatic compound is contained in the film in an amount of 0.01 to 20 weight parts based on 100 weight parts of the cellulose acetate. The film gives an Re retardation value of 20 to 70 nm and an Rth retardation value of 70 to 400 nm.

4 Claims, No Drawings

US 6,559,912 B2

POLARIZER WITH PROTECTIVE FILM CONSISTING OF ONE CELLULOSE ACETATE FILM HAVING PARTICULAR PARAMETERS

This application is a continuation divisional of Application Ser. No. 09/797,947, filed on Mar. 5, 2001 U.S. Pat. No. 6,476,892.

FIELD OF THE INVENTION

The present invention relates to an optical compensatory sheet consisting of one cellulose acetate film. The invention also relates to a polarizing plate and a liquid crystal display equipped with the optical compensatory sheet.

BACKGROUND OF THE INVENTION

A cellulose acetate film has been used for various photographic or optical materials because it is sturdy and hardly flamed. The cellulose acetate film is a typical photographic support. The cellulose acetate film is also used in a liquid crystal display. Since the cellulose acetate film has a high optical isotropy (i.e., a low retardation value) compared with other polymer films, the cellulose acetate film is usually used as an optical isotropic element (e.g., a transparent protective film of a polarizing plate) of a liquid crystal display.

In contrast, an optical compensatory sheet (a retardation film) used in a liquid crystal display must have a high optical anisotropy (i.e., a high retardation value). Accordingly, a synthetic polymer film giving a high retardation value, such as a polycarbonate film or a polysulfone film, is usually used as an optical compensatory sheet.

Generally in the field of optical materials, the synthetic polymer film is used as an optically anisotropic film (having a high retardation value), while a cellulose acetate film is used was an optical isotropic film (having a low retardation value).

European Pat. No. 0911656 A2, however, discloses a cellulose acetate film having a high retardation value. The film is used as a support of an optical compensatory sheet, which comprises the support an d an optically anisotropic layer containing a discotic liquid crystal molecule.

SUMMERY OF THE INVENTION

An object of the present invention to optically compensate a liquid crystal cell by using only one cellulose acetate film.

Another object of the invention is to provide an optical compensatory sheet consisting of one cellulose acetate film.

A further object of the invention is to add an optical compensatory function to a polarizing plate without increasing members of the plate.

A furthermore object of the invention to provide a liquid crystal display optically compensated by a cellulose acetate film.

The present invention provides an optical compensatory sheet consisting of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, and said cellulose acetate film giving an Re retardation value of 20 to 70 nm and an Rth retardation value of 70 to 400 nm.

The invention also provides a polarizing plate comprising a polarizing membrane and two transparent protective films provided on both sides of the membrane, wherein one of the transparent protective films consists of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 70 to 400 nm, and said polarizing membrane being so placed that a slow axis of the cellulose acetate film is essentially parallel to a transparent axis of the polarizing membrane.

The invention further provides a liquid crystal display comprising a liquid crystal cell and two polarizing plates provided on both sides of the cell, said polarizing plate comprising a polarizing membrane and two transparent protective films provided on both sides of the membrane, wherein an optical compensatory sheet is provided between the liquid crystal cell and one of the polarizing plates, said optical compensatory sheet consisting of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 150 to 400 nm, and said cellulose acetate film and the polarizing membrane neighboring the film being so placed that a slow axis of the cellulose acetate film is essentially parallel to a transparent axis of the polarizing membrane.

The invention furthermore provides a liquid crystal display comprising a liquid crystal cell and two polarizing plates provided on both sides of the cell, said polarizing plate comprising a polarizing membrane and two transparent protective films provided on both sides of the membrane, wherein one of the two transparent protective films placed between the cell and the membranes consists of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 150 to 400 nm, and said cellulose acetate film and the polarizing membrane neighboring the film being so placed that a slow axis of the cellulose acetate film is essentially parallel to a transparent axis of the polarizing membrane.

The invention still further provides a liquid crystal display comprising a liquid crystal cell and two polarizing plates provided on both sides of the cell, said polarizing plate comprising a polarizing membrane and two transparent protective films provided on both sides of the membrane, wherein an optical compensatory sheet is provided between the liquid crystal cell and each polarizing plate, said optical compensatory sheet consisting of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 70 to 200 nm, and said cellulose acetate film and the polarizing membrane neighboring the film being so placed that a slow axis of the cellulose acetate film is essentially parallel to a transparent axis of the polarizing membrane.

The invention still furthermore provides a liquid crystal display comprising a liquid crystal cell and two polarizing plates placed on both sides of the cell, said polarizing plate comprising a polarizing membrane and two transparent protective films provided on both sides of the membrane, wherein each of the two transparent protective films placed between the cell and the membranes consists of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 70 to 200 nm, and said cellulose acetate film and the polarizing membrane neighboring the film being so placed that a slow axis of the cellulose acetate film is essentially parallel to a transparent axis of the polarizing membrane.

The present inventor has improved the cellulose acetate film disclosed in European Patent No. 0911656 A2, and succeeded in optically compensating a liquid crystal cell by using the improved film only.

The cellulose acetate film giving an Re retardation value of 20 to 70 nm and an Rth retardation value of 70 to 400 nm can be obtained by selecting an additive (i.e., an aromatic compound having at least two aromatic rings), adjusting the amount of the additive, and controlling film-forming conditions (for example, by controlling the stretching ratio of the film). The obtained film has a high optical anisotropy to optically compensate a liquid crystal cell. Now, only one cellulose acetate film can be used as an optical compensatory sheet.

A polarizing plate generally has two protective films made of cellulose acetate. The cellulose acetate film having the high retardation values can be used as one of the protective films in the polarizing plate. The polarizing plate having the cellulose acetate film can compensate a liquid crystal cell optically without increasing members of the plate.

An optical anisotropic film can be easily formed by using cellulose acetate having an acetic acid content of less than 59.0%. However, the physical properties of the film are degraded where the acetic acid content is less than 59.0%. In the present invention, cellulose acetate has an acetic acid content in the range of 59.0 to 61.5%. The high retardation values are achieved by other means (namely, by incorporating the additive and by adjusting the film-forming condition). Therefore, the cellulose acetate film used in the invention is excellent in both optical anisotropy and properties.

An optical compensatory sheet consisting of only one cellulose acetate film or a polarizing plate having a protective film of the cellulose acetate film is advantageously used in a liquid crystal display of VA (vertically aligned) or TN (twisted nematic) mode.

DETAILED DESCRIPTION OF THE INVENTION

[Optical or Physical Characteristics of Film]

The Re and Rth retardation values of the cellulose acetate film are defined by the formulas (I) and (II).

$$Re=(nx-ny) \times d \quad (I)$$

$$Rth=\{(nx+ny)/2-nz\} \times d \quad (II)$$

In the formulas (I) and (II), nx is a refractive index along a slow axis (the direction giving the maximum refractive index) in plane of the film, ny is a refractive index along a fast axis (the direction giving the minimum refractive index) in plane of the film, nz is a refractive index along a thickness direction of the film, and d is a thickness of the film. The cellulose acetate film gives the Re retardation value in the ranges of 20 to 70 nm and the Rth retardation values in the ranges of 70 to 400 nm.

In the case that two cellulose acetate films are used in a liquid crystal display, the Rth retardation value of each film is preferably in the range of 70 to 200 nm, more preferably in the range of 100 to 160 nm, and most preferably in the range of 110 to 150 nm.

In the case that one cellulose acetate film is used in a liquid crystal display, the Rth retardation value is preferably in the range of 150 to 400 nm, more preferably in the range of 200 to 280 nm, and most preferably in the range of 220 to 260 nm.

In the case that two cellulose acetate films are used in a liquid crystal display, the Re retardation value of each film is preferably in the range of 30 to 50 nm. In the case that one cellulose acetate film is used in a liquid crystal display, the Re retardation value is preferably in the range of 40 to 60 nm.

The index of birefringence in plane ($\Delta n$: $nx-ny$) of the cellulose acetate film is preferably in the range of 0.00025 to 0.00088, and that along the thickness direction (($nx+ny$)/$2-nz$) is preferably in the range of 0.00088 to 0.005.

The cellulose acetate film has at least one surface having a surface energy preferably n the range of 55 to 75 mN/m, and more preferably in the range of 60 to 75 mN/m.

The amount of a solvent remaining in the cellulose acetate film is preferably in the range of 0.01 to 1.00 wt. %, more preferably in the range of 0.02 to 0.07 wt. %, and most preferably in the range of 0.03 to 0.05 wt. %.

The cellulose acetate film has a moisture absorption swelling index of preferably less than $3.0 \times 10^{-4}$/%RH, more referably less than $1.5 \times 10^{-4}$/%RH, and most preferably less than $1.0 \times 10^{-4}$/%RH. The moisture absorption swelling index of the film is usually more than $1.0 \times 10^{-5}$/%RH.

The haze of the cellulose acetate film is preferably less than 2.0%, more preferably less than 1.0%, and most preferably 0.6%. The haze of the film is usually more than 0.2%.

The cellulose acetate film can be subjected to a saponification treatment (described below). The change of the Re retardation value before and after the saponification treatment is preferably less than 3 nm.

The cellulose acetate film has a water vapor permeability preferably in the range of 100 to 1,000 g/m²/24hr, and more preferably in the range of 300 to 700 g/m²/24hr.

[Cellulose Acetate]

The present invention uses cellulose acetate having an acetic acid content in the range of 59.0 to 61.5%, and preferably in the range of 60.4 to 61.4%.

The term "acetic acid content" means the content of combined acetic acid per unit weight of cellulose. The acetic acid content is determined by the measurement and calculation according to ASTM:D-817-91 (test for cellulose acetate etc.).

The viscosity average polymerization degree of the cellulose acetate is preferably not less than 250, more preferably not less than 290.

The cellulose acetate used in the invention preferably has a narrow molecular weight distribution of Mw/Mn (Mw: weight average molecular weight, Mn: number average molecular weight), which is determined by gel permission chromatography. The value of Mw/Mn is preferably in the range of 1.00 to 1.70, more preferably in the range of 1.30 to 1.65, and most preferably in the range of 1.40 to 1.60.

[Retardation Increasing Agent]

An aromatic compound having at least two aromatic rings is used as a retardation increasing agent to adjust the retardation of the cellulose acetate film. The aromatic compound is used in an amount of 0.01 to 20 weight parts based on 100 weight parts of the cellulose acetate. The amount is preferably in the range of 0.05 to 15 weight parts, more preferably in the range of 0.1 to 10 weight parts based on 100 weight parts of the cellulose acetate. Two or more aromatic compounds can be used in combination.

The aromatic ring in the aromatic compound may be an aromatic heterocyclic ring as well as an aromatic hydrocarbon ring.

It is particularly preferred that the aromatic hydrocarbon ring be a six-membered ring (i.e., benzene ring).

The aromatic heterocyclic ring is generally an unsaturated heterocyclic ring. The unsaturated heterocyclic ring is preferably a five-membered, six-membered or seven-membered ring, and more preferably a five-membered or six-membered ring. The aromatic heterocyclic ring usually contains the maximum number of double bonds. Preferred hetero atoms are nitrogen atom, oxygen atom and sulfur atom, and nitrogen atom is particularly preferred. Examples of the aromatic heterocyclic rings include furan ring, thiophene ring, pyrrole ring, oxazole ring, isooxazole ring, thiazole ring, isothiazole ring, imidazole ring, pyrazole ring, fuazane ring, triazole ring, pyran ring, pyridine ring, pyridazine ring, pyrimidine ring, pyrazine ring and 1,3,5-triazine ring.

Preferred aromatic rings are benzene ring, furan ring, thiophene ring, pyrrole ring, oxazole ring, thiazole ring, imidazole ring, triazole ring, pyridine ring, pyrimidine ring, pyrazine ring and 1,3,5-triazine ring. Benzene ring and 1,3,5-triazine ring are more preferred.

The aromatic compound preferably has at least one 1,3, 5-triazine ring.

The aromatic compound preferably has 2 to 20 aromatic rings, more preferably has 2 to 12 aromatic rings, further preferably has 2 to 8 aromatic rings, and most preferably has 2 to 6 aromatic rings.

Relation between two aromatic rings in the aromatic compound is generally categorized into three types, namely (a) the aromatic rings form a condensed ring, (b) the aromatic rings are directly connected through a single bond, or (c) the aromatic rings are connected through a linking group. The two aromatic rings cannot form a spiro bond.

Examples of the condensed rings of (a) include indene ring, naphthalene ring, azulene ring, fluorene ring, phenanthrene ring, anthracene ring, acetonaphthylene ring, naphthacene ring, pyrene ring, indole ring, isoindole ring, benzofuran ring, benzothiophene ring, indolizine ring, benzoxazole ring, benzothiazole ring, benzoimidazole ring, benzotriazole ring, purine ring, indazole ring, chromene ring, quinoline ring, isoquinoline ring, quinolizine ring, quinazoline ring, cinnoline ring, quinoxaline ring, phthalazine ring, pteridine ring, carbazole ring, acridine ring, phenanthridine ring, xanthene ring, phenazine ring, phenothiazine ring, phenoxthine ring, phnoxazine ring and thianthrene ring. Preferred rings are naphthalene ring, azulene ring, indole ring, benzoxazole ring, benzothiazole ring, benzoimidazole ring, benzotriazole ring and quinoline ring.

The single bond of (b) preferably links a carbon atom in one of the two aromatic rings to a carbon atom in the other. Two or more single bonds may connect the two aromatic rings, and thereby an aliphatic ring or a non-aromatic heterocyclic ring may be formed between the two aromatic rings.

The linking group of (c) also preferably links a carbon atom in one of the two aromatic rings to a carbon atom of the other. Preferred examples of the linking group include an alkylene group, an alkenylene group, an alkynylene group, —CO—, —O—, —NH—, —S— and a combination thereof. Examples of the combined linking group are shown below. In each of the following examples, the right and left ends may be reversed.

c1: —CO—O—
c2: —CO—NH—
c3: —alkylene—O—
c4: —NH—CO—NH—
c5: —NH—CO—O—
c6: —O—CO—O—
c7: —O—alkylene—O—
c8: —CO—alkenylene—
c9: —CO—alkenylene—NH—
c10: —CO—alkenylene—O—
c11: —alkylene—CO—O—alkylene—O—CO—alkylene—
c12: —O—alkylene—CO—O—alkylene—O—CO—alkylene—O—
c13: —O—CO—alkylene—CO—O—
c14: —NH—CO—alkenylene—
c15: —O—CO—alkenylene—

The aromatic ring and the linking group can have a substituent group.

Examples of the substituent group include a halogen atom (F, Cl, Br, I), hydroxyl, carboxyl, cyano, amino, nitro, sulfo, carbamoyl, sulfamoyl, ureido, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and a non-aromatic hetero cyclic group.

The alkyl group preferably has 1 to 8 carbon atoms. A chain alkyl group is preferred to a cyclic one, and a straight chain alkyl group is particularly preferred. The alkyl group may further have a substituent group (e.g., hydroxyl, carboxyl, an alkoxy group, an alkyl-substituted amino group). Example of the (substituted) alkyl group include methyl, ethyl, n-butyl, n-hexyl, 2-hydroxyethyl, 4-carboxybutyl, 2-methoxyethyl and 2-diethylaminoethyl.

The alkenyl group preferably has 2 to 8 carbon atoms. A chain alkenyl group is preferred to a cyclic one, and a straight chain alkenyl group is particularly preferred. The alkenyl group may further have a substituent group. Example of the alkenyl group include vinyl, allyl and 1-hexenyl.

The alkynyl group preferably has 2 to 8 carbon atoms. A chain alkynyl group is preferred to a cyclic one, and a straight chain alkynyl group is particularly preferred. The alkynyl group may further have a substituent group. Example of the alkynyl group include ethynyl, 1-butynyl and 1-hexynyl.

The aliphatic acyl group preferably has 1 to 10 carbon atoms. Examples of the aliphatic acyl group include acetyl, propanoyl and butanoyl.

The aliphatic acyloxy group preferably has 1 to 10 carbon atoms. Examples of the aliphatic acyloxy group include acetoxy.

The alkoxy group preferably has 1 to 8 carbon atoms. The alkoxy group may further have a substituent group (e.g., an alkoxy group). Example of the (substituted) alkoxy group include methoxy, ethoxy, butoxy and methoxyethoxy.

The alkoxycarbonyl group preferably has 2 to 10 carbon atoms. Example of the alkoxycarbonyl group include methoxycarbonyl and ethoxycarbonyl.

The alkoxycarbonylamino group preferably has 2 to 10 carbon atoms. Example of the alkoxycarbonylamino group include methoxycarbonylamino and ethoxycarbonylamino.

The alkylthio group preferably has 1 to 12 carbon atoms. Examples of the alkylthio group include methylthio, ethylthio and octylthio.

The alkylsulfonyl group preferably has 1 to 8 carbon atoms. Examples of the alkylsulfonyl group include methanesulfonyl and ethanesulfonyl.

The aliphatic amido group preferably has 1 to 10 carbon atoms. Examples of the aliphatic amido group include acetamide.

The aliphatic sulfonamido group preferably has 1 to 8 carbon atoms. Examples of the aliphatic sulfonamido group include methanesulfonamido, butanesulfonamido and n-octanesulfonamido.

The aliphatic substituted amino group preferably has 1 to 10 carbon atoms. Examples of the aliphatic substituted amino group include dimethylamino, diethylamino and 2-carboxylethylamino.

The aliphatic substituted carbamoyl group preferably has 2 to 10 carbon atoms. Examples of the aliphatic substituted carbamoyl group include methylcarbamoyl and diethylcarbamoyl.

The aliphatic substituted sulfamoyl group preferably has 1 to 8 carbon atoms. Examples of the aliphatic substituted sulfamoyl group include methylsulfamoyl and diethylsulfamoyl.

The aliphatic substituted ureido group preferably has 2 to 10 carbon atoms. Examples of the aliphatic substituted ureido group include methylureido.

Examples of the non-aromatic hetero cyclic group include piperidino and morpholino.

The retardation increasing agent preferably has a molecular weight of 300 to 800. The retardation increasing agent is described in Japanese Patent Provisional Publication Nos. 2000-111914, 2000-275434 and PCT/JP 00/02619.

[Preparation of Cellulose Acetate Film]

The cellulose acetate film is prepared preferably according to a solvent casting method. In the method, the film is formed from a solution (dope) containing cellulose acetate dissolved in an organic solvent.

The organic solvent is preferably selected from the group consisting of an ether having 3 to 12 carbon atoms, a ketone having 3 to 12 carbon atoms, an ester having 3 to 12 carbon atoms and a halogenated hydrocarbon having 1 to 6 carbon atoms.

The ether, ketone and ester can have a cyclic structure. A compound having two or more functional groups of ether, ketone and ester (i.e., —O—, —CO— and —COO—) is also usable as the organic solvent. The solvent may have other functional groups such as alcoholic hydroxyl. The number of carbon atoms in the solvent having two or more functional groups may be in any of the above-described ranges of the solvents having the functional groups.

Examples of the ether having 3 to 12 carbon atoms include diisopropylether, dimethoxymethane, dimethoxyethane, 1,4-dioxane, 1,3-dioxolan, tetrahydrofuran, anisole and phenetole.

Examples of the ketone having 3 to 12 carbon atoms include acetone, methyl ethyl ketone, diethyl ketone, diisobutyl ketone, cyclohexanone and methyl cyclohexanone.

Examples of the ester having 3 to 12 carbon atoms include ethyl formate, propyl formate, pentyl formate, methyl acetate, ethyl acetate and pentyl acetate.

Examples of the solvent having two or more functional groups include 2-ethoxyethyl acetate, 2-methoxyethanol and 2-butoxyethanol.

The halogenated hydrocarbon has preferably 1 or 2, more preferably one carbon atom. The halogen atom in the halogenated hydrocarbon is preferably chlorine atom. In the halogenated hydrocarbon, hydrogen atoms are substituted with halogen atoms in an amount of preferably 25 to 75 mol %, more preferably 30 to 70 mol %, further preferably 35 to 65 mol %, and most preferably 40 to 60 mol %. Methylene chloride is a typical example of the halogenated hydrocarbon.

Two or more solvents can be used in combination.

The cellulose acetate solution can be prepared according to a conventional method. In the conventional method, the procedures are conducted at a temperature of not less than 0° C. (room temperature or high temperature). The solution can be prepared by a known dope preparation process with an apparatus used in a normal solvent casting method. As the solvent, a halogenated hydrocarbon (particularly, methylene chloride) is preferably used in this method.

The amount of cellulose acetate is so adjusted that the content of cellulose acetate in a prepared solution is in the range of 10 to 40 wt. %, preferably in the range of 10 to 30 wt. %. Additives (described below) can be added to the organic (main) solvent.

Cellulose acetate and the solvent are mixed and stirred at room temperature (0 to 40° C.) to prepare the solution. For preparing the solution of high concentration, the mixture may be stirred at a high temperature and a high pressure in the following manner. Cellulose acetate and the solvent are placed and sealed in a pressure vessel, and then heated and stirred under an increased pressure. The heating temperature is above the boiling point of the solvent at atmospheric pressure, but is set so that the solvent may not boil at the increased pressure. The temperature is usually not lower than 40° C., preferably in the range of 60 to 200° C., and further preferably in the range of 80 to 110° C.

The components of the solution may be beforehand premixed and then charged in the vessel. Otherwise, they may be sequentially added into the vessel. The vessel must be equipped with a stirring means. The pressure in the vessel can be increased by introducing an inert gas such as nitrogen gas or by heating the solvent to increase the vapor pressure. After the vessel is sealed, the components may be added under the increased pressure.

The vessel is preferably heated from outside. For example, a heater of jacket type is usable. Otherwise, a pipe connecting to a plate heater provided outside of the vessel is wound around the vessel, and heated liquid is circulated through the pipe to heat the vessel.

The mixture is preferably stirred with a stirring propeller provided inside of the vessel. The propeller is preferably long enough to reach the inside wall of the vessel. At the ends of the propeller, scratching spatulas are preferably provided to renew the liquid-clinging onto the inside wall.

The vessel may be equipped with meters such as a pressure gauge and a thermometer. The components are dissolved in the solvent in the vessel. The prepared dope is cooled and then taken out from the vessel. Otherwise, the dope is taken out, and then cooled by means of, for example, a heat-exchanger.

The solution can be also prepared by a cooling dissolution method. According to the cooling dissolution method, cellulose acetate can be dissolved even in an organic solvent that hardly dissolves cellulose acetate by a normal method. Further, if an organic solvent that dissolves cellulose acetate by a normal method is used, a uniform cellulose acetate solution is rapidly obtained.

At the first step of the cooling dissolution method, cellulose acetate is gradually added and stirred in an organic solvent at room temperature.

The content of cellulose acetate in the mixture is preferably in the range of 10 to 40 wt. %, and more preferably in the range of 10 to 30 wt. %. In the mixture, additives described after may be optionally beforehand added.

The mixture is then cooled to −100 to −10° C. (preferably −80 to −10° C., more preferably −50 to −20° C., most preferably −50 to −30° C.), for example, in a dry icemethanol bath (−75° C.) or in a cooled ethylene glycol solution (−30 to −20° C.). At this cooling stage, the mixture solidifies.

The cooling rate is preferably faster than 4° C./minute, more preferably faster than 8° C./minute, and most preferably faster than 12° C./minute. The faster the cooling rate is, the more it is preferred. However, the theoretical limit is 10,000° C./minute, the technical limit is 1,000° C./minute, and the practical limit is 100° C./minute. Here "cooling rate" is a value obtained by dividing the temperature difference between before and after cooling by the time for cooling.

The cooled mixture is then warmed to 0 to 200° C. (preferably 0 to 150° C., more preferably 0 to 120° C., most preferably 0 to 50° C.). At this warming stage, cellulose acetate is dissolved in the organic solvent. For warming, the mixture may be left at room temperature or in a hot bath.

The warming rate is preferably faster than 4° C./minute, more preferably faster than 8° C./minute, and most preferably faster than 12° C./minute. The faster the warming rate is, the more it is preferred. However, the theoretical limit is 10,000° C./minute, the technical limit is 1,000° C./minute, and the practical limit is 100° C./minute. Here "warming rate" is a value obtained by dividing the temperature difference between before and after warming by the time for warming.

Thus, a uniform solution of cellulose acetate can be obtained. If cellulose acetate is not sufficiently dissolved, the cooling and warming steps may be repeated. Whether cellulose acetate is sufficiently dissolved or not can be easily determined by observing the solution by eye.

A sealed vessel is preferably used in the above cooling dissolution method to prevent contamination of water, which is caused by dew condensation at the cooling step. The time for the cooling and warming steps can be shortened by conducting the cooling step under a high pressure and by conducting the warming step under a low pressure. A pressure vessel is preferably used under a high or low pressure.

According to differential scanning calorimetry (DSC), a solution prepared by dissolving cellulose acetate (concentration: 20 wt. %, acetylation degree: 60.9%, viscosity average polymerization degree: 299) in methyl acetate by the cooling dissolution method exhibits a pseudo phase transition point at about 33° C. between sol and gel states. Since the solution is in a uniform gel state at a temperature below the pseudo phase transition point, it must be stored at a temperature above the pseudo phase transition point (preferably, at a temperature of about 10° C. higher than the gel phase transition point). The pseudo phase transition point generally depends on acetylation degree and viscosity average polymerization degree of cellulose acetate, concentration of solution, and organic solvent.

From the thus-prepared cellulose acetate solution (dope), a cellulose acetate film is formed according to a solvent cast method.

The dope is cast on a drum or a band, and the solvent is evaporated to form a film. Before casting the dope, the concentration of the dope is preferably so adjusted that the solid content of the dope is in the range of 18 to 35 wt. %. The surface of the drum or band is preferably polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

The drum or band preferably has a surface temperature of not higher than 10° C. when the dope is cast. After casting the dope, the dope is preferably dried with air for at least 2 seconds. The formed film is peeled off the drum or band, and the film can be further dried with air to remove the solvent remaining in the film. The temperature of the air can be gradually elevated from 100 to 160° C. The above-mentioned method is described in Japanese Patent Publication No. 5(1993)-17844. According to the method, the time for casting and peeling steps can be shortened. The method requires that the dope be set to gel at the surface temperature of the drum or band.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include o-acetyltriethyl citrate (OACTE) and o-acetyltributyl citrate (OACTB). Examples of the other carboxylic esters include butyl oleate, methylacetyl ricinoleate, dibutyl sebacate and various trimellitic esters. The plasticizers of phthalic esters (DMP, DEP, DBP, DOP, DPP, DEHP) are preferred, and DEP and DPP are particularly preferred.

The amount of the plasticizer is in the range of preferably 0.1 to 25 wt. %, more preferably 1 to 20 wt. %, most preferably 3 to 15 wt. % based on the amount of cellulose acetate.

Deterioration inhibitors (e.g., oxidation inhibitor, peroxide decomposer, radical inhibitor, metal inactivating agent, oxygen scavenger, amine) can be also incorporated into the cellulose acetate film. The deterioration inhibitors are described in Japanese Patent Provisional Publication Nos. 3(1991)-199201, 5(1993)-1907073, 5(1993)-194789, 5(1993)-271471 and 6(1994)-107854. The amount of the deterioration inhibitor is in the range of preferably 0.01 to 1 wt. %, more preferably 0.01 to 0.2 wt. % based on the amount of the solution (dope). If the amount is less than 0.01 wt. %, the deterioration inhibitor hardly gives the effect. On the other hand, if the amount is more than 1 wt. %, the deterioration inhibitor often bleeds out onto the film surface. Examples of particularly preferred deterioration inhibitors include butyrated hydroxytoluene (BHT) and tribenzylamine (TBA).

The cellulose acetate film can be stretched to adjust the retardation. The degree of stretching is preferably in the range of 3 to 100%, more preferably in the range of 5 to 80%, and most preferably in the range of 10 to 50%.

The thickness of the cellulose acetate film is in the range of preferably 40 to 140 μm, more preferably 70 to 120 μm.

[Surface Treatment of Cellulose Acetate Film]

In the case that the cellulose acetate film is used as a transparent protective film of polarizing plate, the film surface is preferably subjected to a surface treatment.

Examples of the surface treatments include a corona discharge treatment, a glow discharge treatment, a flame treatment, an acid treatment, an alkali treatment and an ultraviolet rays irradiating treatment. The acid treatment or the alkali treatment is preferred. The acid treatment or the alkali treatment can function as a saponification treatment to the cellulose acetate film.

The alkali treatment is particularly preferred. The alkali treatment uses an aqueous alkali solution. The alkali preferably is hydroxide of an alkali metal, such as sodium hydroxide or potassium hydroxide. The aqueous alkali solution has a pH value of preferably higher than 10. At least one surface of the cellulose acetate film is immersed in the aqueous alkali solution preferably for 1 to 300 seconds, more preferably for 5 to 240 seconds. The alkali treatment is conducted preferably at 25 to 70° C., and more preferably at 35 to 60° C. After the alkali treatment, the cellulose acetate film is preferably washed with water.

[Polarizing Plate]

A polarizing plate comprises a polarizing membrane and two transparent protective films provided on both sides of the membrane. The aforementioned cellulose acetate film can be used as one of the protective films. The other protective film may be a usual cellulose acetate film.

There are some types of polarizing plate, namely an iodine polarizing plate, a dye polarizing plate using dichroic dye and a polyene polarizing plate. The iodine polarizing plate and the dye polarizing plate are made with a polyvinyl alcohol film.

The cellulose acetate film and the polarizing membrane are placed so that a slow axis of the film and a transparent axis of the membrane may be essentially parallel.

The transmittance of the polarizing plate measured at the wavelength of 550 nm is preferably in the range of 30 to 50%, more preferably in the range of 35 to 50%, and most preferably in the range of 40 to 50%.

The polarization degree of the plate measured at the wavelength of 550 nm is preferably in the range of 90 to 100%, more preferably in the range of 95 to 100%, and most preferably in the range of 99 to 100%.

[Liquid Crystal Display]

An optical compensatory sheet or a polarizing plate comprising the aforementioned cellulose acetate film is advantageously used in a liquid crystal display, particularly in a liquid crystal display of transmission type.

The liquid crystal display of transmission type comprises a liquid crystal cell and two polarizing plates placed on both sides of the cell. The liquid crystal cell contains liquid crystal placed between two electrode substrates.

The optical compensatory sheet is placed between the liquid crystal cell and one of the polarizing plates or between the cell and each polarizing plate.

In the polarizing plate, the above-described cellulose acetate film is used as the transparent protective film placed between the liquid crystal cell and the polarizing membrane. Only one of the polarizing plates may have a transparent protective film (which is placed between the liquid crystal cell and the polarizing membrane) of the above cellulose acetate film. Otherwise, each polarizing plate may have a transparent protective film of the above cellulose acetate film.

The liquid crystal cell is preferably VA or TN mode.

In the liquid crystal cell of VA mode, rod-like liquid crystal molecules are essentially vertically aligned while voltage is not applied.

The liquid crystal cell of VA mode include three types:

(1) a liquid crystal cell of VA mode in a narrow sense (described in Japanese Patent Provisional Publication No. 2(1990)-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58–59), in which rod-like liquid crystal molecules are essentially vertically aligned while voltage is not applied, and the molecules are essentially oriented in twisted multi-domain alignment while voltage is applied; and (4) a liquid crystal cell of SURVAIVAL mode (published in LCD international 98).

In the liquid crystal cell of TN mode, rod-like liquid crystal molecules are essentially horizontally aligned and twisted at an angle of 60° to 120° while voltage is not applied.

The liquid crystal cell of TN mode is widely used in a color TFT liquid crystal display, and is described in many publications.

EXAMPLE 1

The following components were placed in a mixing tank, and heated and stirred to prepare a cellulose acetate solution.

| Components of cellulose acetate solution | |
|---|---|
| Cellulose acetate (acetylation degree: 60.9%) | 100 weight parts |
| Triphenyl phosphate (plasticizer) | 7.8 weight parts |
| Biphenyldiphenyl phosphate (plasticizer) | 3.9 weight parts |
| Methylene Chloride (first solvent) | 300 weight parts |
| Methanol (second solvent) | 54 weight parts |
| 1-Butanol (third solvent) | 11 weight parts |

In another mixing tank, 16 weight parts of the following retardation increasing agent, 80 weight parts of methylene chloride and 20 weight parts of methanol were placed. The mixture was heated and stirred to prepare a retardation increasing solution.

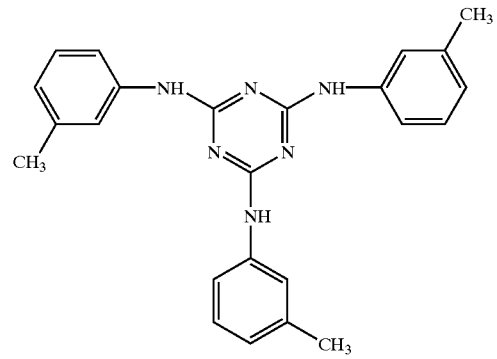

Then, 474 weight parts of the above-prepared cellulose acetate solution and 25 weight parts of the retardation increasing solution were mixed and stirred well to prepare a dope. The amount of the retardation increasing agent was 3.5 weight parts based on 100 weight parts of cellulose acetate.

The dope was cast on a band of a band casting machine to form a film. When the amount of the solvent remaining in the film was 15 wt. %, the film was laterally stretched at 130° C. with a tenter by 25%. Thus, a cellulose acetate film (thickness: 80 μm) was prepared.

The obtained film was evaluated as an optical compensatory sheet. The Re and Rth retardation values at 550 nm were measured by means of an ellipsometer (M150, JASCO). The results are set forth in Table 1.

EXAMPLE 2

The procedure of Example 1 was repeated except that 474 weight parts of the cellulose acetate solution and 56 weight parts of the retardation increasing solution were mixed (7.8 weight parts of the retardation increasing agent was used based on 100 weight parts of cellulose acetate) and that the film was stretched by 14%, to prepare a cellulose acetate film. The obtained film (optical compensatory sheet) was evaluated in the same manner as Example 1. The results are set forth in Table 1.

COMPARISON EXAMPLE 1

The procedure of Example 1 was repeated except that the cellulose acetate solution itself was used as a dope and that the film was not stretched, to prepare a cellulose acetate film. The obtained film (optical compensatory sheet) was evaluated in the same manner as Example 1. The results are set forth in Table 1.

TABLE 1

| Film | Retardation increasing agent | Stretching ratio | Re value | Rth value |
|---|---|---|---|---|
| Ex. 1 | 3.5 weight parts | by 25% | 40 nm | 130 nm |
| Ex. 2 | 7.8 weight parts | by 14% | 50 nm | 240 nm |
| Comp.1 | Not used | Not stretched | 4 nm | 48 nm |

EXAMPLE 3

A stretched polyvinyl alcohol film was made to adsorb iodine, to prepare a polarizing membrane.

The cellulose acetate film prepared in Example 1 was subjected to saponification treatment, and then the film was laminated on one face of the polarizing membrane with a polyvinyl alcohol adhesive.

A commercially available cellulose acetate film (Fujitac TD80UF, Fuji Photo film Co., Ltd.) was subjected to saponification treatment, and then the film was laminated on the other face of the membrane with the polyvinyl alcohol adhesive.

The polarizing membrane and the cellulose acetate film of Example 1 were placed so that the fast axis of the membrane and the slow axis of the film might be parallel. On the other hand, the polarizing membrane and the commercially available cellulose acetate film were placed so that the fast axis of the membrane and the slow axis of the film might be perpendicular to each other.

Thus, a polarizing plate was prepared.

EXAMPLE 4

The procedure of Example 3 was repeated except that the cellulose acetate film prepared in Example 2 was used, to prepare a polarizing plate.

EXAMPLE 5

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 3 was laminated on each side (each of the backlight side and the viewing side) of the cell with an adhesive so that the cellulose acetate film prepared in Example 1 might be inside (neighboring the liquid crystal cell). The polarizing plate on the viewing side was placed so that the fast axis might be longitudinal, while the plate on the backlight side was placed so that the fast axis might be lateral. Thus, the polarizing plates were arranged in the cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth in Table 2.

EXAMPLE 6

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 4 was laminated on the viewing side of the cell with an adhesive so that the cellulose acetate film prepared in Example 2 might be inside (neighboring the liquid crystal cell). On the backlight side, a commercially available polarizing plate (HLC 2-5618HCS, Sanritsu Co., Ltd.) was laminated. The polarizing plate on the viewing side was placed so that the fast axis might be longitudinal, while the plate on the backlight side was placed so that the fast axis might be lateral. Thus, the polarizing plates were arranged in the cross-Nicol position.

The viewing angle of the prepared liquid crystal display was measured by means of a measuring apparatus (EZ-Contrast 160D, ELDIM) when each of eight tones of black (L1) to white (L8) was displayed. The results are set forth-in Table 2.

COMPARISON EXAMPLE 2

The viewing angle of the commercially available liquid crystal display (VL-1530S, Fujitsu, Ltd.), which has a liquid crystal cell comprising vertically aligned liquid crystal molecules, was measured by means of a measuring apparatus (EZ-Contrast 160D, ELDIM) when each of eight gradations of black (L1) to white (L8) was displayed. The results are set forth in Table 2.

TABLE 2

| Liquid crystal display | Viewing angle giving a contrast ratio of 10 or more without reversing gradation of black color* | |
|---|---|---|
|  | Along the fast axis | At 45° to the fast axis |
| Ex. 5 | >80° | >80° |
| Ex. 6 | >80° | >80° |
| Comp. 2 | >80° | 44° |

(Remark)
Gradation of black color*: Gradation between L1 and L2

EXAMPLE 7

A pair of polarizing plates and a pair of optical compensatory sheets were removed from a commercially available liquid crystal display (6E-A3, Sharp Corporation), which has a liquid crystal cell of TN mode. In place of the removed members, the polarizing plate prepared in Example 3 was laminated on each side (each of the backlight side and the viewing side) of the cell with an adhesive so that the cellulose acetate film prepared in Example 1 might be inside (neighboring the liquid crystal cell). The polarizing plates were arranged so that the fast axes might be in O-mode position.

The viewing angle of the prepared liquid crystal display was measured by means of a measuring apparatus (EZ-Contrast 160D, ELDIM) when each of eight tones of black (L1) to white (L8) was displayed. The results are set forth in Table 3.

COMPARISON EXAMPLE 3

The viewing angle of the commercially available liquid crystal display (6E-A3, Sharp Corporation), which has a liquid crystal cell of TN mode, was measured by means of a measuring apparatus (EZ-Contrast 160D, ELDIM) when each of eight gradations of black (L1) to white (L8) was displayed. The results are set forth in Table 3.

TABLE 3

| Liquid crystal | Viewing angle giving a contrast ratio of 10 or more without reversing gradation of black color* | | |
|---|---|---|---|
| display | Upward | Downward | Lateral |
| Ex. 7 | 18° | 23° | 77° |
| Comp. 3 | 15° | 25° | 37° |

(Remark)
Gradation of black color*: Gradation between L1 and L2

EXAMPLE 8

The cellulose acetate film prepared in Example 1 was immersed in 1.5 N aqueous solution of potassium hydroxide at 50° C. for 2 minutes, and neutralized with sulfuric acid. The cellulose acetate film was washed with pure water, and dried. The surface energy of the treated cellulose acetate film was measure according to a contact angle method. As a result, the surface energy was 60 mN/m.

The obtained film was evaluated as an optical compensatory sheet. The Re and Rth retardation values at 550 nm were measured by means of an ellipsometer (M150, JASCO). The results are the same as in Example 1 set forth in Table 1.

EXAMPLE 9

The cellulose acetate film prepared in Example 2 was immersed in 1.5 N aqueous solution of potassium hydroxide at 40° C. for 5 minutes, and neutralized with sulfuric acid. The cellulose acetate film was washed with pure water, and dried. The surface energy of the treated cellulose acetate film was measure according to a contact angle method. As a result, the surface energy was 68 mN/m.

The obtained film was evaluated as an optical compensatory sheet. The Re and Rth retardation values at 550 nm were measured by means of an ellipsometer (M150, JASCO). The results are the same as in Example 2 set forth in Table 1.

EXAMPLE 10

A polarizing plate was prepared in the same manner as in Example 3, except that the cellulose acetate film prepared in Example 8 was used.

EXAMPLE 11

A polarizing plate was prepared in the same manner as in Example 3, except that the cellulose acetate film prepared in Example 9 was used.

EXAMPLE 12

A liquid crystal display of VA mode was prepared and evaluated in the same manner as in Example 5, except that the cellulose acetate film prepared in Example 8 was used.

The results are the same as in Example 5 set forth in Table 2.

EXAMPLE 13

A liquid crystal display of VA mode was prepared and evaluated in the same manner as in Example 5, except that the cellulose acetate film prepared in Example 9 was used.

The results are the same as in Example 6 set forth in Table 2.

EXAMPLE 14

A liquid crystal display of TN mode was prepared and evaluated in the same manner as in Example 7, except that the polarizing plate prepared in Example 10 was used. The results are the same as in Example 7 set forth in Table 3.

EXAMPLE 15

The dope prepared in Example 1 was cast on a band of a band casting machine to form a film. After the surface temperature of the band was cooled to 40° C., the film was dried for 1 minute. The film was removed from the band, and air dried at 140° C. The amount of the solvent remaining in the film was 15 wt. %.

The film was laterally stretched at 130° C. with a tenter by 25%. The film was dried at 140° C. for 20 minutes. The amount of the solvent remaining in the film was 0.3 wt. %. Thus, a cellulose acetate film (thickness: 80 $\mu$m) was prepared.

The obtained film was evaluated as an optical compensatory sheet. The Re and Rth retardation values at 550 nm were measured by means of an ellipszmeter (M150, JASCO). The results are the same as in Example 1 set forth in Table 1.

EXAMPLE 16

A stretched polyvinyl alcohol film was made to adsorb iodine, to prepare a polarizing membrane.

The cellulose acetate film prepared in Example 15 was laminated on one face of the polarizing membrane with a polyvinyl alcohol adhesive.

A commercially available cellulose acetate film (FUJITAC TD80UF, Fuji Photo film Co., Ltd.) was subjected to saponification treatment, and then the film was laminated on the other face of the membrane with the polyvinyl alcohol adhesive. The film was dried at 80° C. for 10 minutes.

The polarizing membrane and the cellulose acetate film of Example 15 were placed so that the fast axis of the membrane and the slow axis of the film might be parallel. On the other hand, the polarizing membrane and the commercially available cellulose acetate film were placed so that the fast axis of the membrane and the slow axis of the film might be perpendicular to each other.

Thus, a polarizing plate was prepared.

EXAMPLE 17

A liquid crystal display of VA mode was prepared and evaluated in the same manner as in Example 5, except that the cellulose acetate film prepared in Example 15 was used. The results are the same as in Example 5 set forth in Table 2.

EXAMPLE 18

A liquid crystal display of TN mode was prepared and evaluated in the same manner as in Example 7, except that the polarizing plate prepared in Example 16 was used. The results are the same as in Example 7 set forth in Table 3.

EXAMPLE 19

The following components were placed in a mixing tank, and heated and stirred to prepare a cellulose acetate solution.

| Components of cellulose acetate solution | |
| --- | --- |
| Cellulose acetate (acetylation degree: 60.9%) | 100 weight parts |
| Triphenyl phosphate (plasticizer) | 7.8 weight parts |
| Biphenyldiphenyl phosphate (plasticizer) | 3.9 weight parts |
| Methylene Chloride (first solvent) | 336 weight parts |
| Methanol (second solvent) | 29 weight parts |

Then, 474 weight parts of the above-prepared cellulose acetate solution and 25 weight parts of the retardation increasing solution prepared in Example 1 were mixed and stirred well to prepare a dope. The amount of the retardation increasing agent was 3.5 weight parts based on 100 weight parts of cellulose acetate.

The dope was cast on a band of a band casting machine to form a film. After the surface temperature of the band was cooled to 40° C., the film was dried for 1 minute. The film was removed from the band, and air dried at 140° C. The amount of the solvent remaining in the film was 15 wt. %.

The film was laterally stretched at 130° C. with a tenter by 25%. The film was dried at 140° C. for 20 minutes. The amount of the solvent remaining in the film was 0.3 wt. %. Thus, a cellulose acetate film (thickness: 80 μm) was prepared.

The obtained film was evaluated as an optical compensatory sheet. The Re and Rth retardation values at 550 nm were measured by means of an ellipsometer (M150, JASCO). The results are the same as in Example 1 set forth in Table 1. The moisture absorption swelling index of the cellulose acetate film was measured. As a result, the index was $1.2 \times 10^{-4}$/%RH.

EXAMPLE 20

The procedure of Example 1 was repeated except that 6.0 weight parts of the retardation increasing agent was used based on 100 weight parts of cellulose acetate solution and that the film was stretched by 30%, to prepare a cellulose acetate film. The obtained film (optical compensatory sheet) was evaluated in the same manner as Example 1. As a result, the Re retardation value was 50 nm, and the Rth retardation value was 130 nm. The moisture absorption swelling index of the cellulose acetate film was measured. As a result, the index was $7.6 \times 10^{-5}$/%RH.

The prepared cellulose acetate film was immersed in 2 N aqueous solution of potassium hydroxide at 25° C. for 2 minutes, and neutralized with sulfuric acid. The cellulose acetate film was washed with pure water, and dried. The surface energy of the treated cellulose acetate film was measure according to a contact angle method. As a result, the surface energy was 63 mN/m.

EXAMPLE 21

A polarizing plate was prepared in the same manner as in Example 3, except that the cellulose acetate film prepared in Example 19 was used.

EXAMPLE 22

A polarizing plate was prepared in the same manner as in Example 3, except that the cellulose acetate film prepared in Example 20 was used.

EXAMPLE 23

A pair of polarizing plates and a pair of optical compensatory sheets were removed from a commercially available liquid crystal display (VL-1530S, Fujitsu, Ltd.), which has a liquid crystal cell comprising vertically aligned liquid crystal molecules. In place of the removed members, the polarizing plate prepared in Example 21 was laminated on the viewing side of the cell with an adhesive so that the cellulose acetate film prepared in Example 19 might be inside (neighboring the liquid crystal cell). A commercially available polarizing plate (HLC2-5618HCS, Sanritsu) was laminated on the other side of the cell. The polarizing plate on the viewing side was placed so that the fast axis might be longitudinal, while the plate on the backlight side was placed so that the fast axis might be lateral. Thus, the polarizing plates were arranged in the cross-Nicol position.

The viewing angle of the prepared liquid crystal display was measured by means of a measuring apparatus (EZ-Contrast 160D, ELDIM) when each of eight tones of black (L1) to white (L8) was displayed. The results are the same as in Example 5 set forth in Table 2.

EXAMPLE 24

A liquid crystal display of TN mode was prepared and evaluated in the same manner as in Example 7, except that the polarizing plate prepared in Example 22 was used. The results are the same as in Example 7 set forth in Table 3.

EXAMPLE 25

The following components were placed in a mixing tank, and heated and stirred to prepare a cellulose acetate solution.

| Components of cellulose acetate solution | |
| --- | --- |
| Cellulose acetate (acetylation degree: 60.9%) | 100 weight parts |
| Triphenyl phosphate (plasticizer) | 7.8 weight parts |
| Biphenyldiphenyl phosphate (plasticizer) | 3.9 weight parts |
| Methylene Chloride (first solvent) | 336 weight parts |
| Methanol (second solvent) | 30 weight parts |

In another mixing tank, 16 weight parts of the retardation increasing agent used in Example 1, 92 weight parts of methylene chloride and 8 weight parts of methanol were placed. The mixture was heated and stirred to prepare a retardation increasing solution.

Then, 474 weight parts of the above-prepared cellulose acetate solution and 25 weight parts of the retardation increasing solution were mixed and stirred well to prepare a dope. The amount of the retardation increasing agent was 3.5 weight parts based on 100 weight parts of cellulose acetate.

The dope was cast on a band of a band casting machine to form a film. When the amount of the solvent remaining in the film was 15 wt. %, the film was laterally stretched at 130° C. with a tenter by 25%. The film was left at 50° C. for 30 seconds while keeping the stretched width. Thus, a cellulose acetate film (thickness: 80 μm) was prepared.

The obtained film was evaluated as an optical compensatory sheet. The Re and Rth retardation values at 550 nm were measured by means of an ellipsometer (M150, JASCO). As a result, the Re retardation value was 40 nm, the Rth retardation value was 130 nm, and the haze was 0.3%.

EXAMPLE 26

The dope prepared in Example 25 was cast on a band of a band casting machine to form a film. When the amount of the solvent remaining in the film was 15 wt. %, the film was laterally stretched at 130° C. with a tenter by 25%. The film was left at 50° C. for 15 seconds while keeping the stretched width. Thus, a cellulose acetate film (thickness: 80 μm) was prepared.

The obtained film was evaluated as an optical compensatory sheet. The Re and Rth retardation values at 550 nm were measured by means of an ellipsometer (M150, JASCO). As a result, the Re retardation value was 39 nm, the Rth retardation value was 132 nm, and the haze was 0.3%.

EXAMPLE 27

A cellulose acetate film was prepared in the same manner as in Example 25, except that 474 weight parts of the cellulose acetate solution was mixed with 56 weight parts of the retardation increasing solution, and that the film was stretched by 14%. The amount of the retardation increasing agent was 7.8 weight parts based on 100 weight parts of cellulose acetate.

The obtained film was evaluated as an optical compensatory sheet. The Re and Rth retardation values at 550 nm were measured by means of an ellipsometer (M150, JASCO). As a result, the Re retardation value was 50 nm, the Rth retardation value was 240 nm, and the haze was 0.4%.

EXAMPLE 28

A cellulose a cetate film was prepared in the same manner as in Example 25, except that the film was stretched by 40%.

The obtained film was evaluated as an optical compensatory sheet. The Re and Rth retardation values at 550 nm were measured by means of an ellipsometer (M150, JASCO). As a result, the Re retardation value was 51 nm, the Rth retardation value was 137 nm, and the haze was 0.9%.

EXAMPLE 29

A polarizing plate was prepared in the same manner as in Example 3, except that the cellulose acetate film prepared in Example 25 was used.

EXAMPLE 30

A polarizing plate was prepared in the same manner as in Example 3, except that the cellulose acetate film prepared in Example 26 was used.

EXAMPLE 31

A polarizing plate was prepared in the same manner as in Example 3, except that the cellulose acetate film prepared in Example 27 was used.

EXAMPLE 32

A polarizing plate was prepared in the same manner as in Example 3, except that the cellulose acetate film prepared in Example 28 was used.

EXAMPLE 33

A liquid crystal display of VA mode was prepared in the same manner as in Example 5, except that the cellulose acetate film prepared in Example 25 was used.

The maximum and minimum front contrast ratios were measured. As a result, the maximum contrast ratio was 400, and the minimum contrast ratio was 328.

Further, the maximum and minimum viewing angles were measured. As a result, the maximum viewing angle was more than 160°, and the minimum viewing angle was 150°.

EXAMPLE 34

A liquid crystal display of VA mode was prepared in the same manner as in Example 5, except that the polarizing plate prepared in Example 30 was used.

The maximum and minimum front contrast ratios were measured. As a result, the maximum contrast ratio was 388, and the minimum contrast ratio was 291.

Further, the maximum and minimum viewing angles were measured. As a result, the maximum viewing angle was more than 160°, and the minimum viewing angle was 140°.

EXAMPLE 35

A liquid crystal display of VA mode was prepared in the same manner as in Example 6, except that the polarizing plate prepared in Example 31 was used.

The maximum and minimum front contrast ratios were measured. As a result, the maximum contrast ratio was 384, and the minimum contrast ratio was 328.

Further, the maximum and minimum viewing angles were measured. As a result, the maximum viewing angle was more than 160°, and the minimum viewing angle was 152°.

EXAMPLE 36

A liquid crystal display of TN mode was prepared and evaluated in the same manner as in Example 7, except that the polarizing plate prepared in Example 29 was used.

The maximum and minimum front contrast ratios were measured. As a result, the maximum contrast ratio was 227, and the minimum contrast ratio was 122.

Further, maximum and minimum viewing angles were measured. As a result, the maximum viewing angle was 160°, and the minimum viewing angle was 110°.

EXAMPLE 37

A liquid crystal display of TN mode was prepared and evaluated in the same manner as in Example 7, except that the polarizing plate prepared in Example 30 was used.

The maximum and minimum front contrast ratios were measured. As a result, the maximum contrast ratio was 214, and the minimum contrast ratio was 112.

Further, maximum and minimum viewing angles were measured. As a result, the maximum viewing angle was 160°, and the minimum viewing angle was 100°.

EXAMPLE 38

The dope prepared in Example 1 was cast on a band of a band casting machine to form a film. When the amount of the solvent remaining in the film was 15 wt. %, the film was laterally stretched at 130° C. with a tenter by 25%. The film was left at 50° C. for 30 seconds while keeping the stretched width. Thus, a cellulose acetate film (thickness: 80 μm) was prepared.

The obtained film was evaluated as an optical compensatory sheet. The results are the same as in Example 1 set forth in Table 1.

The prepared cellulose acetate film was immersed in 1.5 N aqueous solution (pH 13) of sodium hydroxide at 55° C. for 2 minutes, washed with pure water, and dried. The change of the Re retardation value before and after the saponification treatment was measured. As a result, the change of the Re retardation was −2 nm.

Further, the amount of the retardation increasing agent dissolved in the aqueous solution of sodium hydroxide was measured. As a result, 0.1 wt. % of the agent was dissolved in the solution.

EXAMPLE 39

A polarizing plate was prepared in the same manner as in Example 3, except that the cellulose acetate film prepared in Example 38 was used.

EXAMPLE 40

A liquid crystal display of VA mode was prepared and evaluated in the same manner as in Example 6, except that the polarizing plate prepared in Example 39 was used.

The results are the same as in Example 6 set forth in Table 2.

EXAMPLE 41

A liquid crystal display of TN mode was prepared and evaluated in the same manner as in Example 7, except that the polarizing plate prepared in Example 39 was used.

The results are the same as in Example 7 set forth in Table 3.

EXAMPLE 42

A cellulose acetate film was prepared in the same manner as in Example 1.

The water vapor permeability of the film was measured. As a result, the water vapor permeability was 450 g/m²/24hr.

EXAMPLE 43

A polarizing plate was prepared in the same manner as in Example 3.

The transmittance of the polarizing plate was measured at the wavelength of 550 nm. As a result, the transmittance was 43%.

The polarization degree of the plate was measured at the wavelength of 550 nm. As a result, the polarization degree was 99.9%.

I claim:

1. A polarizing plate comprising a polarizing membrane and two transparent protective films provided on both sides of the membrane, wherein one of the transparent protective films consists essentially of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 70 to 400 nm, and said polarizing membrane being so placed that a slow axis of the cellulose acetate film is essentially parallel to a transparent axis of the polarizing membrane.

2. A liquid crystal display comprising a liquid crystal cell and two polarizing plates provided on both sides of the cell, said polarizing plate comprising a polarizing membrane and two transparent protective films provided on both sides of the membrane, wherein one of the two transparent protective films placed between the cell and the membranes consists essentially of one cellulose acetate film which comprises cellulose acetate having an acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 150 to 400 nm, and said cellulose acetate film and the polarizing membrane neighboring the film being so placed that a slow axis of the cellulose acetate film is essentially parallel to a transparent axis of the polarizing membrane.

3. The liquid crystal display as defined in claim 2, wherein the liquid crystal cell is a liquid crystal cell of VA or TN mode.

4. A liquid crystal display comprising a liquid crystal cell and two polarizing plates placed on both sides of the cell, said polarizing plate comprising a polarizing membrane and two transparent protective films provided on both sides of the membrane, wherein each of the two transparent protective films placed between the cell and the membranes consists essentially of one cellulose acetate film which comprises cellulose acetate having a acetic acid content in the range of 59.0 to 61.5% and an aromatic compound having at least two aromatic rings, said aromatic compound being contained in the film in an amount of 0.01 to 20 weight parts based on 100 weight parts of the cellulose acetate, said cellulose acetate film giving an Re retardation value of 20 to 70 nm and an Rth retardation value of 70 to 200 nm, and said cellulose acetate film and the polarizing membrane neighboring the film being so placed that a slow axis of the cellulose acetate film is essentially parallel to a transparent axis of the polarizing membrane.

* * * * *

UNITED STATES PATENT AND TRADEMARK OFFICE
CERTIFICATE OF CORRECTION

PATENT NO. : 6,559,912 B2
DATED : May 6, 2003
INVENTOR(S) : Aminaka

It is certified that error appears in the above-identified patent and that said Letters Patent is hereby corrected as shown below:

Column 22,
Line 56, insert:

5. The liquid crystal display as defined in claim 4, wherein the liquid crystal display cell is a liquid crystal cell of VA or TN mode.

Signed and Sealed this

Twenty-ninth Day of June, 2004

JON W. DUDAS
*Acting Director of the United States Patent and Trademark Office*